July 26, 1927.  1,637,154

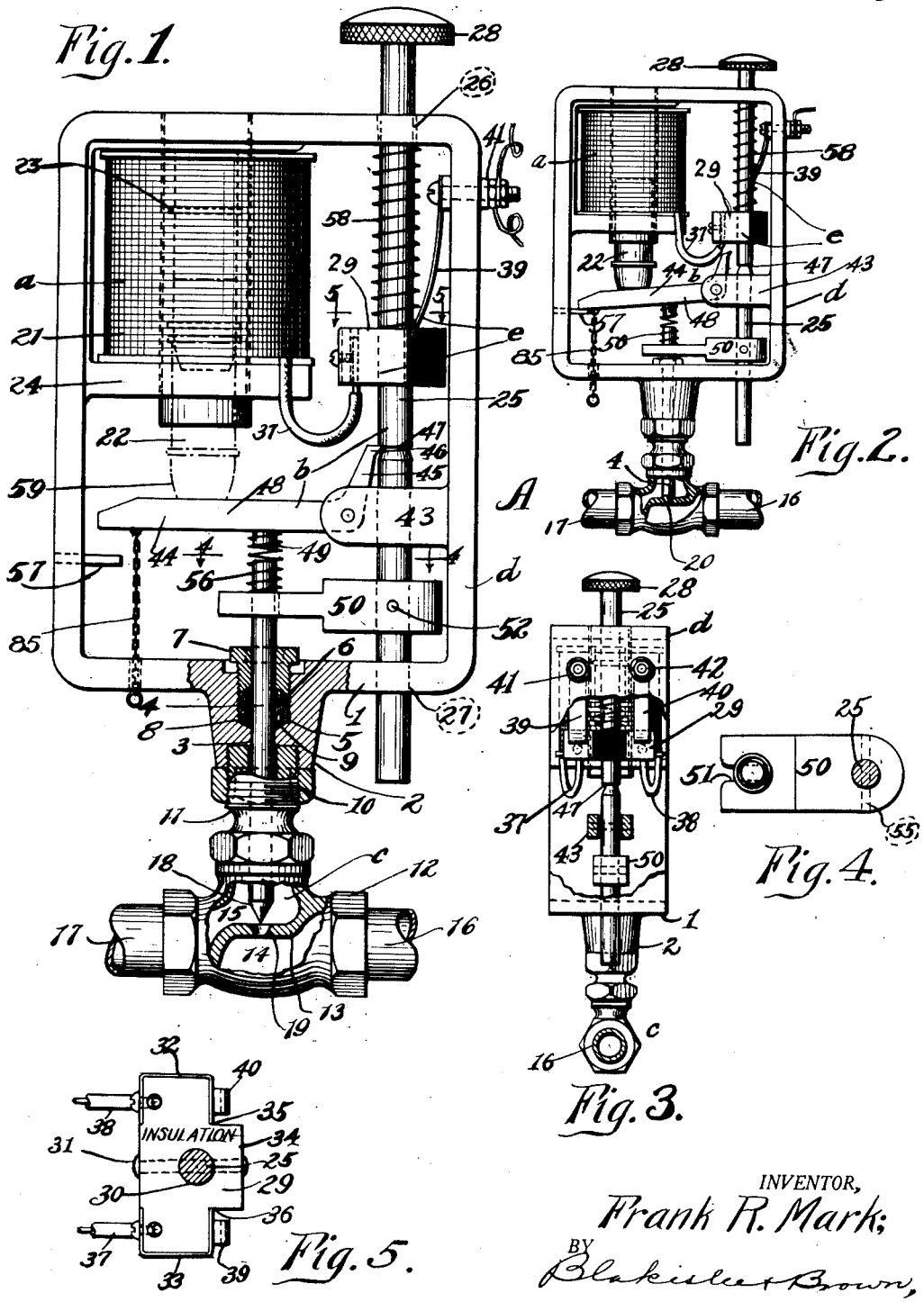

F. R. MARK

VALVE

Original Filed June 8, 1923   2 Sheets-Sheet 2

Inventor,
Frank R. Mark;
By Beakule+Brown
Attorneys.

Patented July 26, 1927.

1,637,154

UNITED STATES PATENT OFFICE.

FRANK R. MARK, OF LOS ANGELES, CALIFORNIA.

VALVE.

Application filed June 8, 1923, Serial No. 644,251. Renewed June 6, 1927.

This invention relates to valves, and particularly to that type of valve which is in a measure controlled by an electrically operated solenoid adapted to close the valve if the current supply to such solenoid should, for any reason, be cut off.

The invention has for an object the provision of a valve of this character which is simple of construction, fool-proof in operation and positive in its action. A further object is the provision of a valve adapted to control the passage of fluid therethrough in such a manner as to stop all flow of fluid in case of impairment of any apparatus directly associated with such valve.

With the above and other objects in view, the invention consists in the novel and useful provision, formation, construction, association, combination and relative arrangement of the various parts, members and features, all as disclosed in certain embodiments in the accompanying drawings, described generally, and finally pointed out in claims.

In the drawings:

Figure 1 is a side elevation, certain parts being in section, of the improved valve member as an entirety;

Figure 2 is a view similar to Figure 1, and on a reduced scale, showing the valve operated;

Figure 3 is a view similar to Figure 2 and illustrating fragmentarily an end elevation of certain of the working parts of the device;

Figure 4 is a view taken on the line 4—4 of Figure 1, and looking in the direction of the appended arrows;

Figure 5 is a view taken on the line 5—5 of Figure 1 and looking in the direction of the appended arrows; and, Figures 6, 7 and 8 illustrate adaptations of the invention to various uses and purposes.

Corresponding parts in all the figures are designated by the same reference characters.

Figure 6:
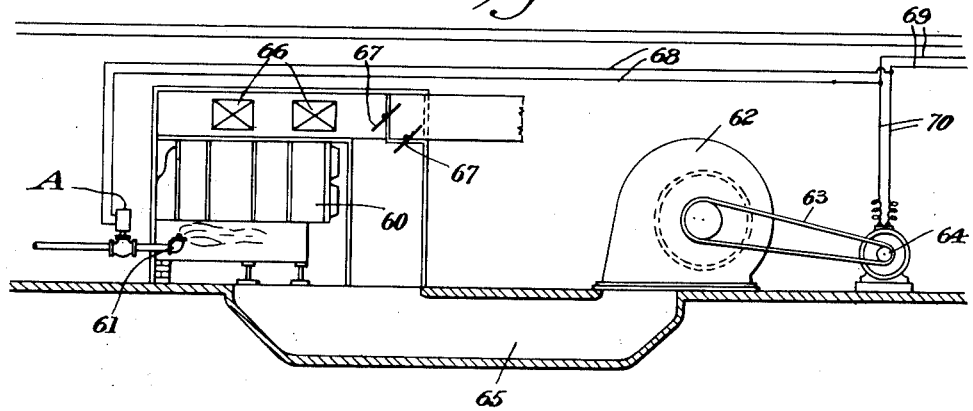

Referring with particularity to the drawings, I have designated the improved valve as an entirety and in one embodiment by A, of which $a$ is a solenoid, $b$ latch means, $c$ a valve, and $d$ a casing adapted to house the solenoid, latch means $b$, as well as contact means $e$. The casing $d$ is formed at one end thereof as 1, with an enlargement 2, which enlargement is formed with a central bore 3 through which a valve stem 4 constituting a part of the valve $c$, is passed. The said enlargement is likewise formed with an enlarged recess 5, the wall surrounding the same being screw-threaded as shown at 6, with the said screw-threaded portion adapted to receive an annular cap nut 7, there being a stuffing or packing gland 8 adapted to be interposed between such cap nut 7 and the wall 9 of the enlargement 2. It will of course be understood that the packing gland 8 is annular in formation so as to permit the valve stem 4 to be passed therethrough, and the enlargement as just described including the packing gland and nut 7, constitutes what may be termed a stuffing box. The enlargement is further recessed and screw-threaded as shown at 10 for reception of a screw-threaded annular member 11 constituting a part of the valve housing 12 of the valve $c$. In particular the valve $c$ is formed with a valve seat 13 dividing the interior of the valve housing 12 into two parts, as 14 and 15, there being outlet conduits 16 and 17 communicating with the respective parts 14 and 15 of the valve housing. The valve stem is formed with a conical head 18 adapted to be seated within a tapered or conical bore 19 of the valve seat 13 when the valve stem is actuated so as to close the said opening such as shown in Figure 2, at 20. To accomplish this closing action the latch means $b$ must be operated and the latch means $b$ is operated when an electric current which is ordinarily passed through the solenoid $a$, is for any reason shut off so as to cause the core member of said solenoid to drop and actuate a portion of such latch means. Particularizing, the said solenoid $a$ includes the usual annular coil member 21 with a movable core 22 normally received within the coils of the solenoid winding 21 as illustrated by the dotted lines at 23. This solenoid is conveniently held within the casing $d$ by means of a bracket member 24. One portion of the latch means $b$ includes a latch stem 25 which projects entirely through the casing and through openings 26 and 27 within such casing, one end of said latch stem being provided with a finger-piece 28. Adapted to be carried upon said latch stem is a portion of the contact means $e$, which contact means in the showing includes a block 29 formed with a bore 30 through which the latch stem 25 is passed, there being a pin 31 passed through such block and the stem 25 for maintaining said block to said stem. The block 29 is formed of some material having insulating properties and said block is likewise provided with strips of electrical conducting material 32 and 33.

Figure 5 illustrates the shape of such block and in which it will be seen that the block is formed with a projection 34 dividing the zone of the members 32 and 33, such projection forming two stop portions as 35 and 36. Wire leads 37 and 38 in turn are associated with the respective ends of the windings of the solenoid. The contact means likewise incorporates contact fingers 39 and 40, and it will be noted upon reference to Figure 1 that said contact fingers are bent so as to engage the members 32 and 33 when the latch stem is in one position, and to disengage such parts 32 and 33 when said latch stem is in a second position, as illustrated in Figure 2. The upper ends of said contact fingers 39 and 40 are associated with binding posts 41 and 42 passed through insulated openings in the casing d. Attached to said casing d and on the interior thereof is a bracket 43 which has pivotally associated therewith a second portion of the latch means b, said second portion constituting a lever 44, which lever has two arm portions angularly related, one of said arm portions as 45 being formed with a nose 46 adapted to at times engage a ledge 47 formed by cutting away a portion of the latch stem 25, as shown in Figure 1. A second arm portion of said lever 44 shown as 48, carries a projection 49 in normal alignment with the stem 4 and likewise spaced slightly therefrom. Also carried on the latch stem 25 is a link 50, which link is formed with a furcation 51 in engagement with the stem 4. This engagement is effected by slightly grooving the stem 4, the furcation 51 being recessed in such grooves, and the link 50 is associated with the stem 25 and secured in a definite position on said stem by means of the pin 52 passed through such link and the stem 25. Likewise interposed between the arm 48 of the lever 44, and surrounding the stud or projection 49 and that portion of the stem 4 above the link 50, is a coil spring 56.

Figure 7:
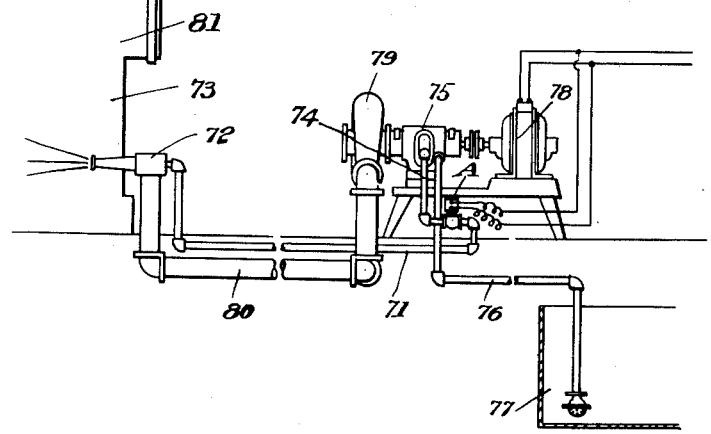
Figure 8:
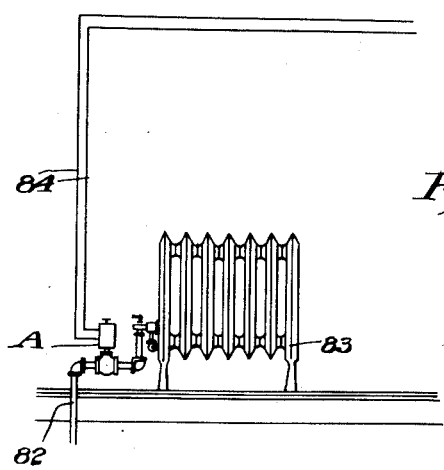

The operation of the device just described, is as follows:

Assume the parts in the position shown in Figure 2 in which the following will be observed: the core 22 of the solenoid a is resting upon the arm 48 of the lever 44, said arm being forced downwardly and held in a definite position by a projection 57, with the nose 46 out of contact with the ledge 47 on the stem 25; the stem 4 is seated within the valve seat 19, and the contact fingers 39 are out of engagement with the contact block 29. The valve stem is held seated within the valve seat by the spring 58, which spring 58 is interposed between the inner surface of the top of the casing d and the insulation block 29. If it were desired to restore the valve so that fluid might pass therethrough, the finger-piece 28 might be moved upwardly, and the spring 56 is of a size sufficient to produce an upward movement of the arm 48 so as to cause the nose 46 to engage the ledge 47 of the stem 25 and hold the stem in such elevated position. This would constitute a manual operation of the valve, and the view would now be similar to that shown in Figure 1 with the solenoid core 22 in the position indicated by the dotted lines at 59, that is, resting upon the arm 48. If electricity were now passed to the binding posts 41 and 42, an electric current would be completed through said binding posts, the contact arms 39 and 40, the electrical conducting members 32 and 33 on the block 29, and thence through the leads 37 and 38 to the winding of the solenoid, and the core would be drawn upwardly within the windings of the solenoid into the position illustrated by 23 in Figure 1. Assume now that the current is cut off, the core 22 of said solenoid would then drop, and the distance between the head of said core when the core is within the solenoid and the arm 48 allows the core to gain momentum on dropping sufficient to disengage the nose 46 from the ledge 47. In other words, it requires sudden impact of the core against the arm 48 to disengage the nose 46 from such ledge 47 so that the stem 25 may move under influence of the spring 58, downwardly to close the valve stem 18 upon the valve seat of the member c. We thus may operate the present valve either manually or electrically, and it is necessary after the valve has been operated to restore the same manually. If for any reason the electricity is not passed through the solenoid and it were desired to close the valve, this might be readily accomplished by pulling upon the chain 85 attached to the arm 48 and passed through an opening in the casing d. It is thus possible to either open or close the valve manually or to close the valve electrically, as has been described. This is assurance against mistake and renders this device fool-proof, as will more clearly appear from the statement of application of the valve to various devices, which application is illustrated in Figures 6 to 8 inclusive, said figures not being inclusive of all adaptations of the valve, but rather illustrating views of its adaptations. In Figure 6 I have illustrated said valve operating in conjunction with a hot air furnace and in which 60 is a furnace, 61 an oil or gas line having the burner thereof under the furnace 60, with the valve member A interposed in line 61. A fan 62 driven by a continuous belt 63 associated with a motor shaft 64, may have the air or draft created by said fan conducted through a suitable conduit 65 to the furnace 60. Various outlet conduits 66 may be provided with dampers 67 therein for controlling the supply of heated air for disposition elsewhere. Electrical circuits 68 connect with the valve member A and with the power leads 69, said circuit being interposed likewise in the motor circuit 70. It is obvious that so long as the fan is in operation in driving air past the furnace 60 that there is no likelihood of a burnout in the furnace, but if for any reason the load should be broken in the circuit 69, the motor would stop operating, the fan would stop rotating, and the burner would continue its flame against the furnace, often times overheating such furnace and resulting in setting fire to the surrounding structure. However, by placing my valve A in the gas or oil line 61, upon the voltage drop the valve will operate and shut off supply of oil or gas to such burner. Consequently no burnouts are effected.

In Figure 7 I have illustrated a similar system in which A is the valve associated with the pipe 71 leading to a burner 72 within a furnace 73, with a second pipe 74 leading to an oil pump 75, said oil pump in turn being associated through a pipe 76 with an oil tank 77, said oil pump being driven by a motor 78, which motor likewise drives an air fan 79, said air fan conducting air through a pipe 80 to the burner 72. The burner is within the furnace 73, there being a boiler 81 adapted to be heated by a burning of oil emitted through said burner. The operation of this form of burner in which air and oil are pumped to the same under high pressure, is well understood and will not be detailed in this description. However, if for any reason the oil pump 75 should cease to function, due to the current of electricity driving member 78 being shut off, the valve A would immediately operate and shut off any flow of oil through the pipe leading to the burner, and thus prevent any burnouts.

In Figure 8 is shown an adaptation of the valve A associated with a gas line 82 connecting with a gas radiator 83, the usual power circuit 84 being associated with the valve A. If for any reason the gas pressure should suddenly drop, the burners in the gas radiator might go out and then come on, resulting in the room being filled with fumes of gas and often causing asphyxiation of persons within said room. Assuming that the gas radiator is controlled from a basement, gas radiators like that shown being installed in rooms of an apartment house or hotel, the engineer upon noticing a sudden gas drop might switch off the electrical current leading to the valves A, which would operate said valves, and prevent a flame within said gas radiator from going out and then coming on, resulting in gas fumes. By this method it would be necessary to telephone or otherwise inform the occupants of the rooms having gas radiators 83, that the pressure of gas was now sufficient to light the gas radiator, whereupon they might restore the said device by lifting upwardly upon the finger-piece 28 of the valve A, and the current upon being passed through said valve would again draw the core 22 upwardly within the solenoid windings.

It is obvious that many adaptations of the invention may be resorted to and that many changes and variations may be made in practicing the invention, in departure from the particular showing, without departing from the true spirit of the invention.

Having thus disclosed my invention, I claim and desire to secure by Letters Patent:

1. A device of the character disclosed, including a valve, a valve stem adapted to open or close said valve, a solenoid provided with a movable core, a latch arm, a latch stem releasably held by the latch arm, a contact block upon said latch stem and associated with the windings of said solenoid, contact fingers normally engaging said contact block when the latch stem is in one position to complete a circuit through said fingers, contact block and the solenoid windings, a dropping of said core of the solenoid actuating the latch arm to permit movement of the latch stem carrying the contact block out of engagement with the contact fingers.

2. A device of the character disclosed, including a valve, a valve stem adapted to open or close said valve, a solenoid provided with a movable core, a latch arm, a latch stem releasably held by the latch arm, a contact block upon said latch stem and associated with the windings of said solenoid, contact fingers normally engaging said contact block when the latch stem is in one position to complete a circuit through said fingers, contact block and the solenoid windings, a dropping of said core of the solenoid actuating the latch arm to permit movement of the latch stem carrying the contact block out of engagement with the contact fingers, and means associated with the latch stem urging said latch stem in one direction.

3. A device of the character disclosed, including a latch stem, a valve stem adapted to open and close a valve, a pivoted latch member adapted to cooperate with the latch stem to maintain the same in a given position, a rigid connection between the latch stem and the valve stem, and a resilient connection between such latch arm and such rigid connection aforesaid; there being a no voltage release solenoid above such latch arm, such solenoid being provided with a drop core, said solenoid being in a normally closed electrical circuit when the valve stem is unseated, an opening of such electrical circuit dropping the solenoid core to strike the latch arm, releasing the latch stem and seating the valve stem.

4. A device of the character disclosed, including a latch stem, a valve stem adapted to open and close a valve, a pivoted latch member adapted to cooperate with the latch stem to maintain the same in a given position, a rigid connection between the latch stem and the valve stem, and a resilient connection between such latch arm and such rigid connection aforesaid; there being a no voltage release solenoid above such latch arm, such solenoid being provided with a drop core, said solenoid being in a normally closed electrical circuit when the valve stem is unseated, an opening of such electrical circuit dropping the solenoid core to strike the latch arm, releasing the latch stem and seating the valve stem; there being means normally urging such latch stem to seat the valve stem.

5. A device of the character disclosed, including a latch stem, a valve stem adapted to open and close a valve, a pivoted latch member adapted to cooperate with the latch stem to maintain the same in a given position, a rigid connection between the latch stem and the valve stem, and a resilient connection between such latch arm and such rigid connection aforesaid; there being a no voltage release solenoid above such latch arm, such solenoid being provided with a drop core, said solenoid being in a normally closed electrical circuit when the valve stem is unseated, an opening of such electrical circuit dropping the solenoid core to strike the latch arm, releasing the latch stem and seating the valve stem; there being means normally urging such latch stem to seat the valve stem; movement of the latch stem in an opposite direction unseating such valve stem and latching such latch stem to the latch arm.

In testimony whereof, I have signed my name to this specification.

FRANK R. MARK.